Feb. 6, 1923.

L. G. COPEMAN.
REFRIGERATOR.
FILED JUNE 16, 1921.

INVENTOR.
LLOYD G. COPEMAN
BY
Stuart C Barnes
ATTORNEY.

Feb. 6, 1923.
L. G. COPEMAN.
REFRIGERATOR.
FILED JUNE 16, 1921.
1,444,589.
6 SHEETS—SHEET 2.
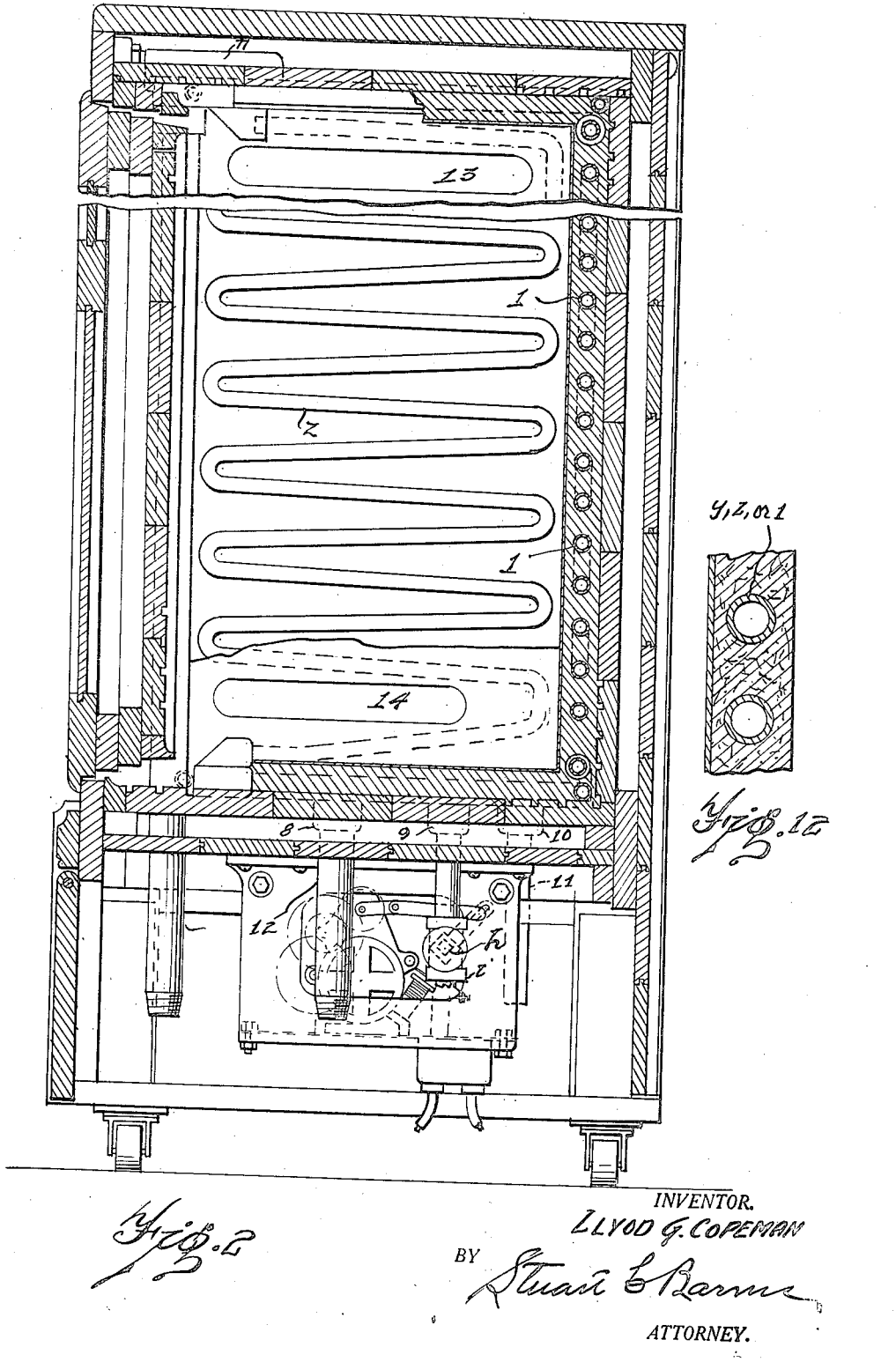
INVENTOR.
LLYOD G. COPEMAN
BY
ATTORNEY.

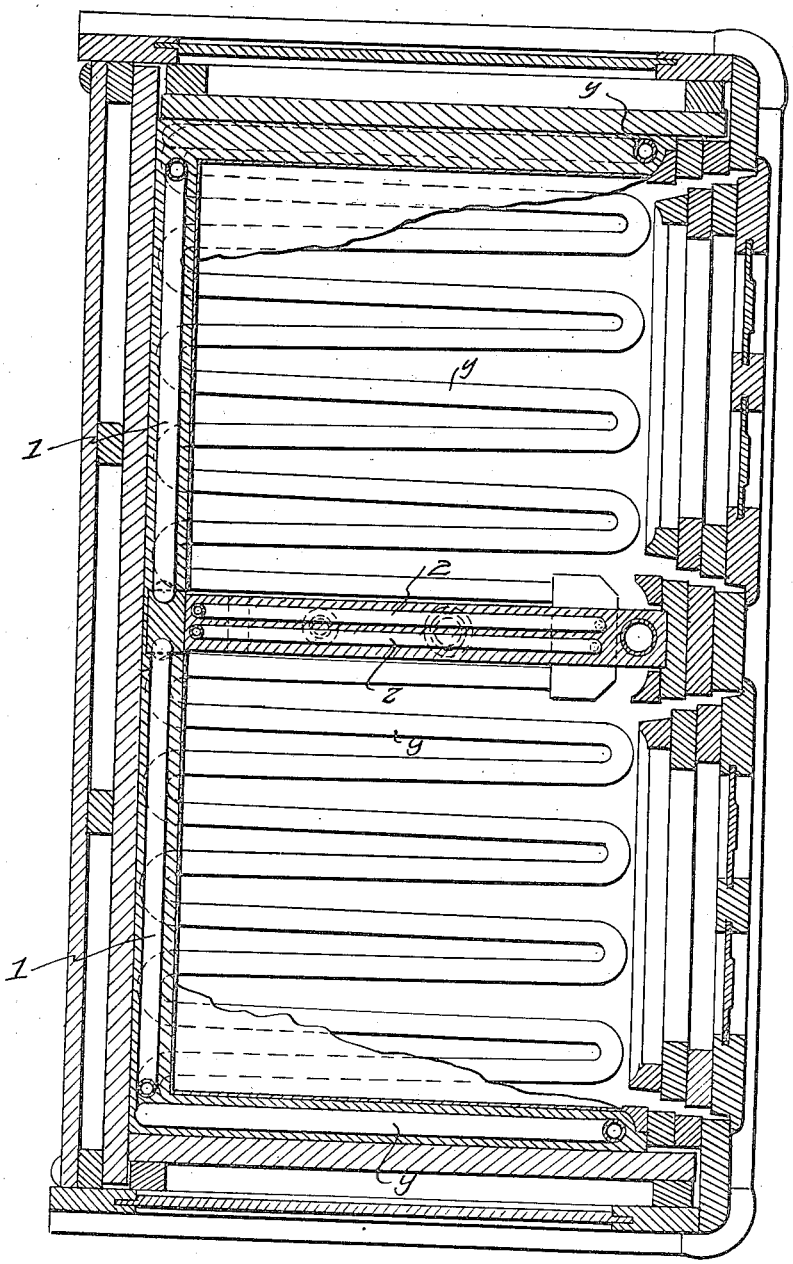

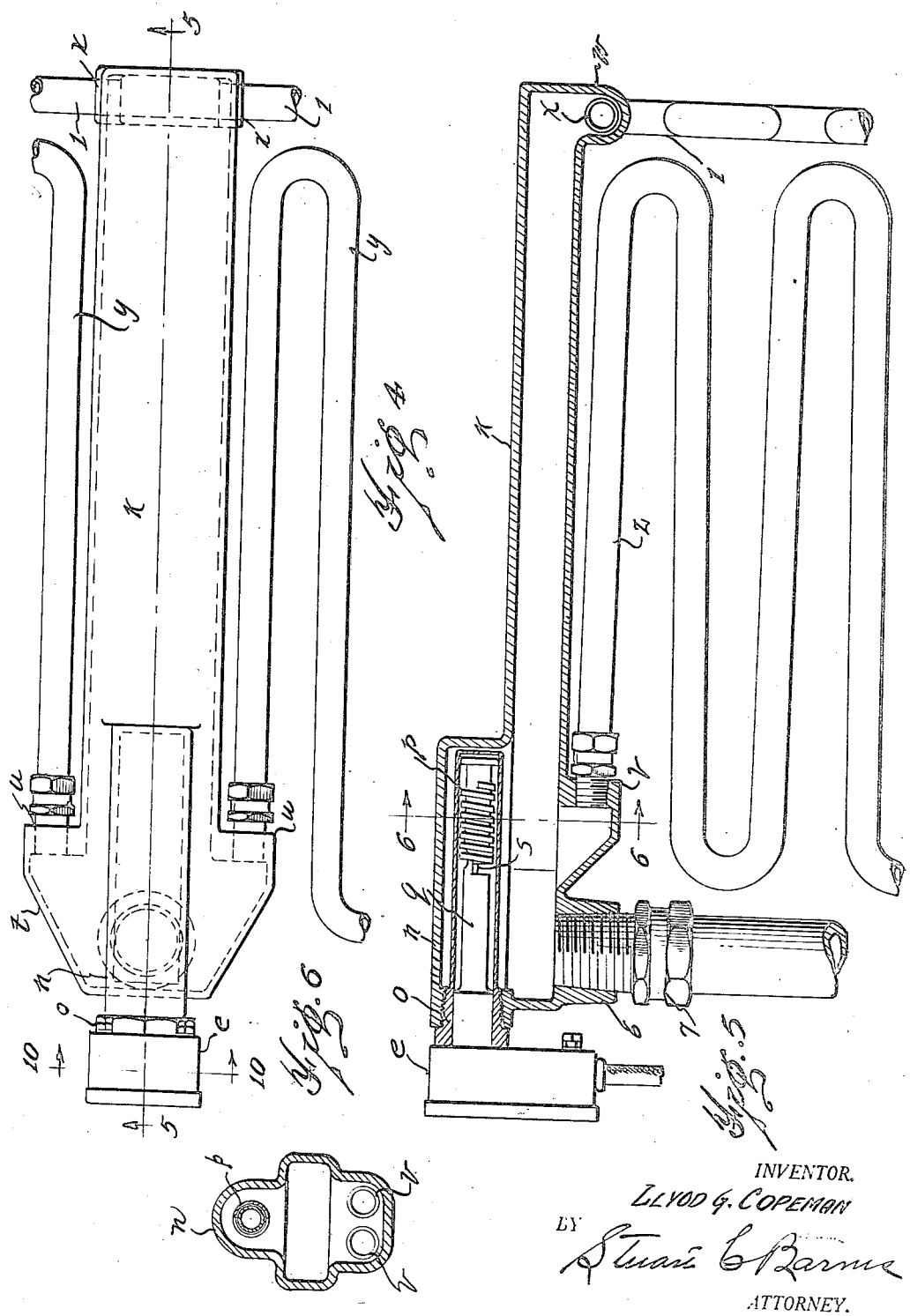

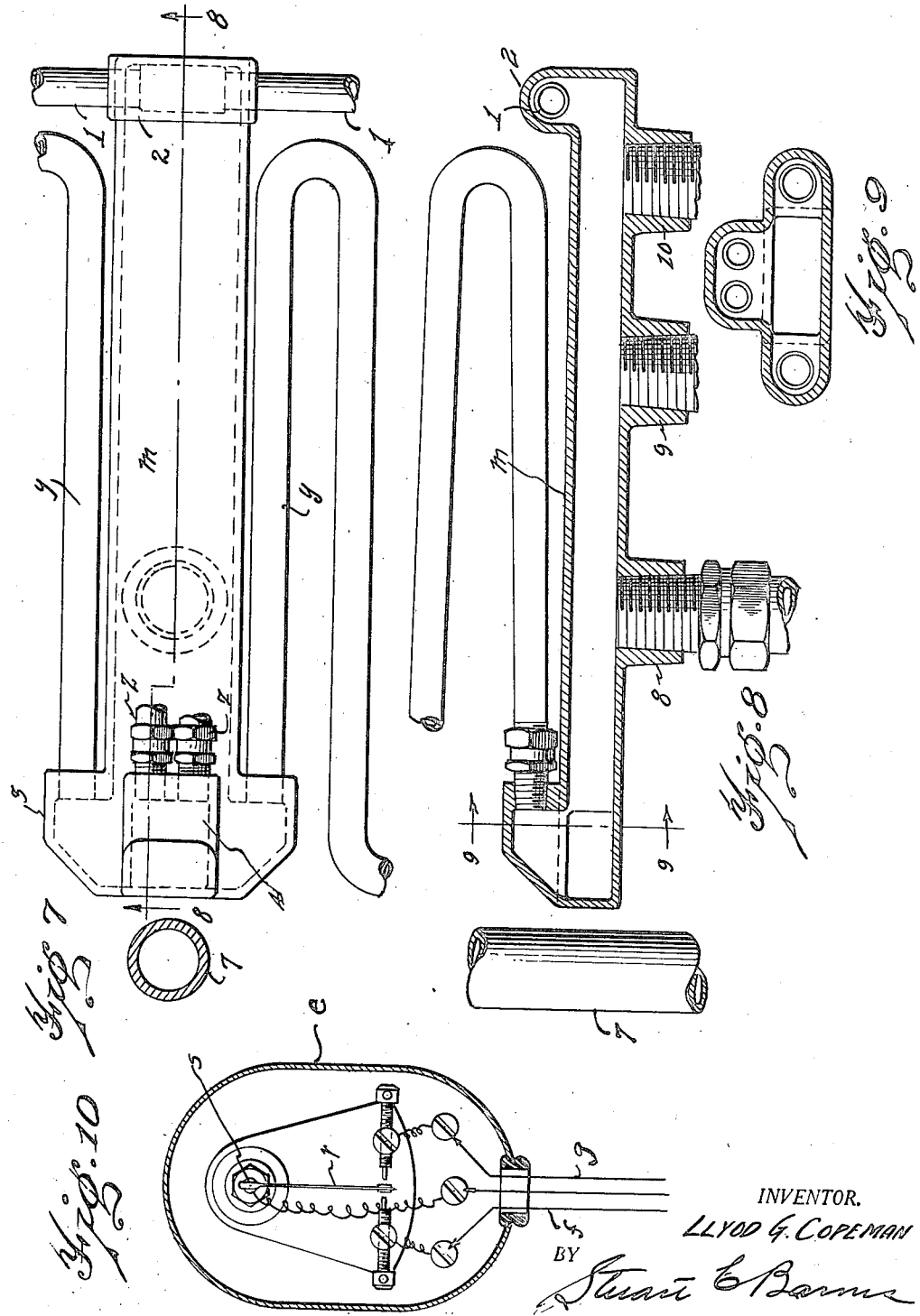

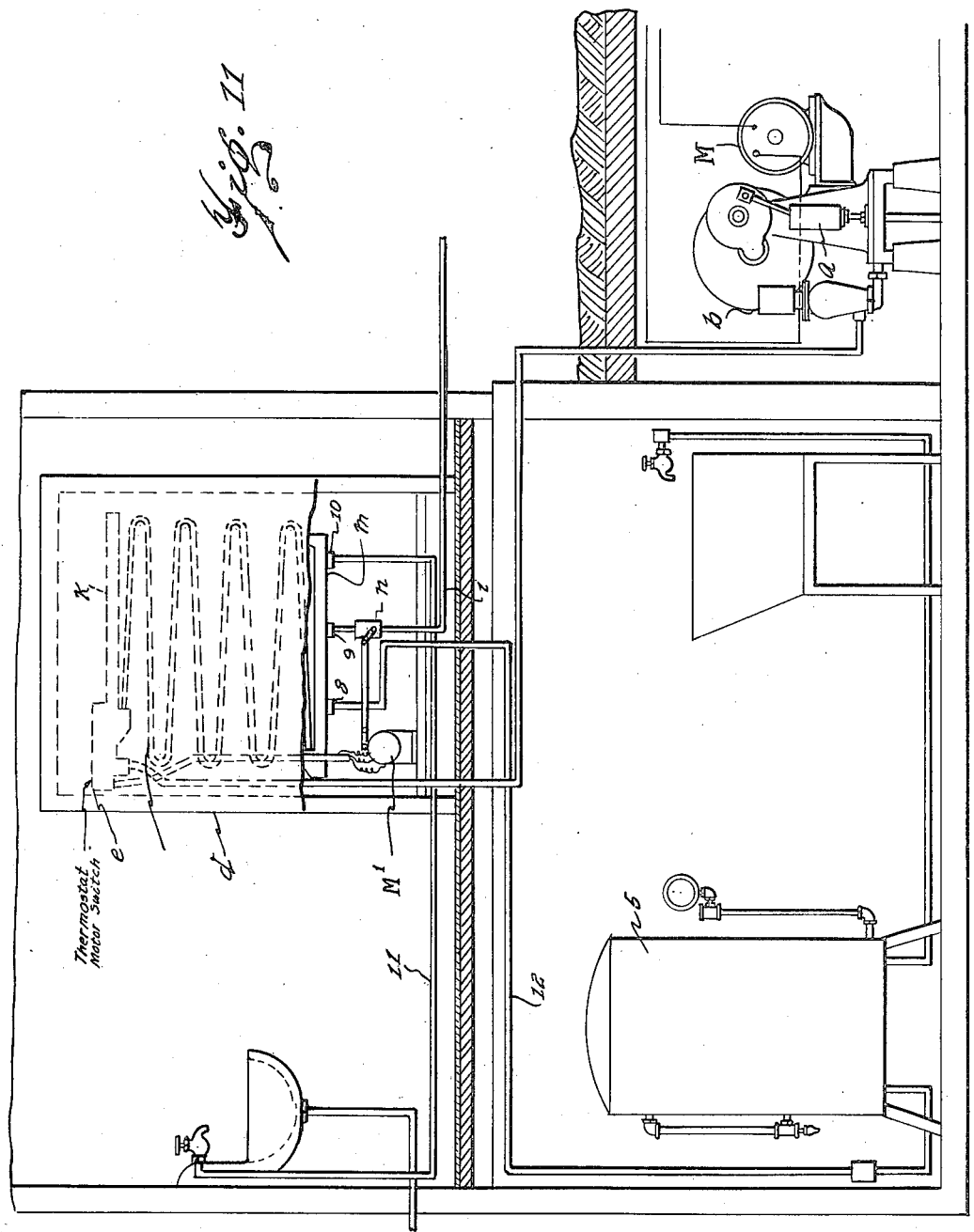

Patented Feb. 6, 1923.

1,444,589

UNITED STATES PATENT OFFICE.

LLOYD GROFF COPEMAN, OF FLINT, MICHIGAN, ASSIGNOR TO EDWIN W. ATWOOD, OF FLINT, MICHIGAN.

REFRIGERATOR.

Application filed June 16, 1921. Serial No. 477,906.

*To all whom it may concern:*

Be it known that I, LLOYD G. COPEMAN, a citizen of the United States, residing at Flint, in the county of Genesee and State of Michigan, have invented certain new and useful Improvements in Refrigerators, of which the following is a specification.

This invention relates to refrigeration, and has for its object an installation that is intended to use well water or other available cold water as a cooling medium for the box. In some of my prior applications, namely, Nos. 438,593 and 440,637, I have described in detail a refrigerating installation for food preserving boxes and in those applications I have described the general mode of operation, to-wit, the circulation of a chilled water through the box and an automatic control which regulates the circulation in accordance with thermal conditions in the box. The present refrigerating unit works on the same plan but the improvement is directed to and the claims are drawn to an arrangement and disposition of the coils which make it an efficient and practical refrigerating unit of this type. Among the features of improvement are the following:

The coils are not in series but the water distribution is divided into an upper and lower header, the separate sections of coils leading from one header to the other. This eliminates what would otherwise be a very objectionable back pressure and would have an injurious effect upon the use of the water distribution system for ordinary service purposes, as will be later explained.

The disposition of the coils at the top and bottom of the refrigerator is such as to give them a gradual pitch and the disposition of the coils that run up and down the sides of the refrigerator is such that each run of pipe declines from end to end. These two features afford adequate security for proper drainage. Otherwise when the box is exposed in frigid weather the water in the coils would freeze and practically ruin the box due to the inability to repair the same.

A refrigerator with exposed coils would be a very unsanitary one and one that would be very hard to clean. With an ordinary covering for the coils, such as plates or the like, a large part of the heat-absorbing properties of the coils and water contained therein would be lost due to the lack of proper heat conductivity of the surrounding medium. However, to avoid these objections and present a neat, cleanable and sightly interior for the box, I provide a stone encasement for the coils. The coils after having been properly located in the box to get the suitable drainage alluded to are completely encased in a plastic material that soon hardens and sets to form a stone-work which completely covers the coils and provides a smooth surface for the interior of the box. This stone-work is slightly porous as contradistinguished from a glass enameled interior which has no capacity of absorbing moisture. This porosity of the stone-work results in a phenomenon, namely, the stone-work absorbs moisture when the cold water is running through the coils. Later on this moisture again evaporates, resulting in the lowering of the temperature, thereby tending to prolong the period in which the box remains in a chilled condition and staying off the necessity of again circulating the water to re-chill the box.

Still another feature of the stimulation of circulation in the stone-encased box by exposing at one part of the box some few coils for the purpose of producing an unbalanced thermal condition in the box to promote circulation. This will be explained in detail.

In the drawings,—

Fig. 2 is a vertical cross section taken from front to back.

Fig. 3 is a horizontal cross section of the box.

Fig. 4 is a plan view of the top header.

Fig. 5 is a longitudinal section of the top header and adjacent parts.

Fig. 6 is a vertical cross section taken on the line 6—6 of Fig. 5.

Fig. 7 is a plan view of the bottom header.

Fig. 8 is a longitudinal section taken on the line 8—8 of Fig. 7.

Fig. 9 is a cross section taken on the line 9—9 of Fig. 8.

Fig. 10 is a cross section taken on the line 10—10 of Fig. 4, showing the thermostat.

Fig. 11 is a diagrammatic view of the installation.

Fig. 12 is a fragmentary section through the stone-work encasement for the coils.

Figure 1:
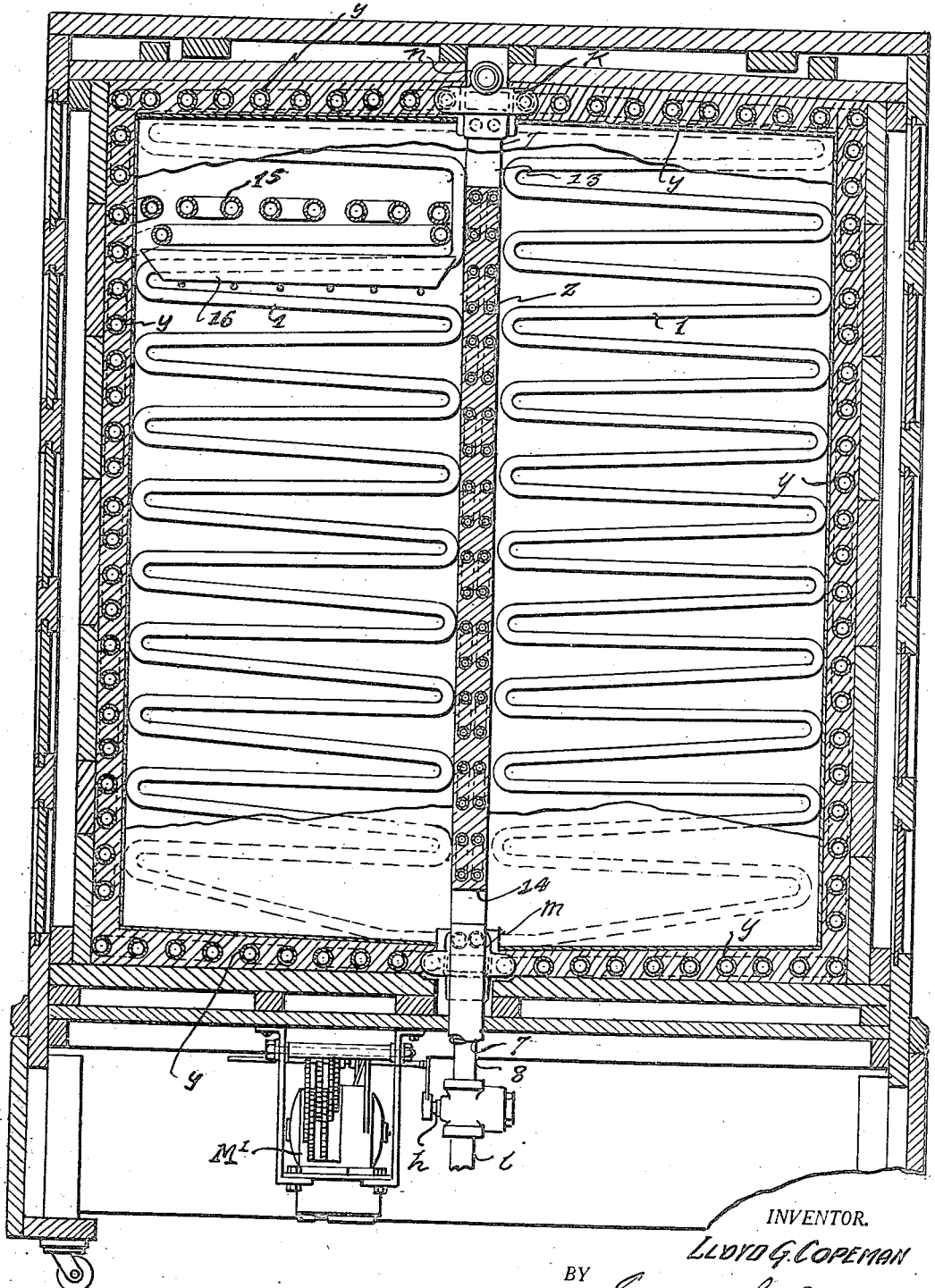
Fig. 1 is a vertical cross section of the refrigerator taken from side to side.

Now briefly as to the general operation—referring to Fig. 11, the detail of this installation is given in my prior application, a designates the ordinary pressure-controlled pump that is used to pump well water on a farm; b is the pressure control for the electric motor M which drives the pump. When the pressure in the line falls due to the opening of a bibb or service tap anywhere, the pressure-controlled switch turns the current into the motor and starts the pump working. So too when the temperature in the refrigerating box d falls the thermostat e (detailed in Fig. 10) closes the circuit through either one wire f or the other wire g and operates the motor M' that controls the waste valve h in the waste pipe i.

Now referring to Fig. 1, it will be seen there is an upper header k and a lower header m. Referring to Figs 4 and 5, it will be seen just how the upper header is constructed. It is a special casting provided at the front and top with a boss n screw-threaded at its forward end to take the thermostat barrel o which screws into it. This has a pipe thread so as to make it water-tight. This barrel forms a water-tight enclosure for the coiled thermostat band p which engages around the spindle q of the thermostat. This band p is in the familiar way made up of two metals, one of a large and the other of a small coefficient of expansion. The consequence is that when there is a thermal change the band either unwinds or winds up, giving a torsional action, serving to rotate the electric switch arm r (see Fig. 10) attached to the spindle s which is also attached to the end of the coiled thermostatic band p (see Fig. 5). This provides a very sensitive thermostat which is susceptible to very small fluctuations in temperature. In my application #440,637 I have described in detail the reason for locating the thermostat in the water line and that feature of the invention is claimed in that application.

Reverting to the casting that forms the header construction k, it will be seen that at the front the header is provided with an enlargement t provided with two side pipe ports u and two bottom pipe ports v (see Fig. 6). The back of the casting is provided with a dip w provided with pipe ports x at either side. The top header has, therefore, six outlet ports. The two side front outlet ports are for the coils y that run across the top of the refrigerator from the center to each side and down each side and across the bottom back to the lower header m. Note the pitch of the coils at the top of the box from the header to each side (Fig. 1). Note the pitch of each run of pipe from one end to the other (see Fig. 2).

Now turning to the details of the header k (Figs. 4 and 5), it will be seen that the front and bottom outlet ports v are for connection with the center partition coils z. These run down the center of the box, as is plainly shown in Fig. 1, and enter the bottom header, as shown in Fig. 2 at the top and front. Again referring to Fig. 5, it will be apparent that the two rear ports x are for the purpose of providing outlet connections with the two sets of rear coils 1 which run down the rear of the box, zig-zagging from the center to the side and back and always maintaining a declination from one end to the other for the purpose of drainage. In fact, this is the condition of all the coils. Referring to Figs. 7 and 8, it will be found that these rear coils enter a boss 2 on the lower header in much the same way that they leave the dip in the upper header. It will also be seen that the sections of coils y, y enter the side ports in the enlargement 3 of the lower header while the partition coils z enter the front boss 4 on the lower header m.

These headers make a very convenient way of dividing the water so it will flow through the box in six different streams. This is necessary for otherwise if it were sent through the box in series the resistance of these coils would be so great to the passage of the water as to very materially affect the pressure in the storage tank 5 (Fig. 11) which is a part of almost every water distribution system of this character. The coils, if not divided, would also create a serious back pressure upon the pump. By division the objections outlined are overcome. Furthermore, the specific header design is calculated to provide a very useful and easy connection with the pipes to the headers.

It will be noticed that the upper header is provided at the front and bottom with a nipple 6 arranged to take the water pipe 7 through which the water enters the header. By referring to Figs. 11 and 8 it will be seen that the lower header has three outlet nipples 8, 9 and 10. The outlet 9 connects with the waste line i. The outlet 10 connects with some service tap or taps fed by a separate service line 11, as indicated in Fig. 11. The outlet 8 connects with the storage tank main 12.

This division of outlets serves a very useful purpose in economizing the use of water. The storage tank does very often not draw on the pump for replenishment for considerable periods of time, sometimes hours. When it does draw, it draws a considerable amount of water, such an excess over the requirements of the box that a great deal of this water is wasted so far as its function of heat absorption is concerned. Hence the waste valve would ordinarily have to be depended upon during intervals between operations of the storage tank. Of course, all chilling action due to the operation of the waste valve is water wasted for other purposes. Hence by providing the third outlet from the lower header to one or two service taps that are frequently used, it is possible to get an intermittent circulation of service water at frequent intervals that will largely economize in the use of waste water for chilling.

With the headers and the coils as described simply hung on the insulated walls of the refrigerator box, not only an unsightly but an unsanitary food container would result. In order to overcome these objections I encase the major part of both the header constructions and all the coils except one set presently to be noted in the stone-work, which is first in a plastic condition and sets after the pipes have been suitably covered with it. It will be understood that the pipes have first been properly hung or supported on the rough interior walls of a properly insulated box. The center requires no previously built partition as the pipes and the stone-work constitute a suitable partition after the same is finished. This stone-work may be formed of several well-known materials and hence it is not necessary to describe it in detail. It may be made out of sand and any suitable cementitious material. The only characteristics required are that it be of a composition that permits it to be put in place in a plastic condition and then set into a hard condition not easy to fracture. It should also preferably be more or less porous when set for a purpose to be explained, and it should also be a good conductor of heat. It is necessary that it be the last for obviously the water could not properly absorb the heat from the interior of the refrigerator without undue waste were not an efficient heat conductor provided. The porosity which I prefer to have in the stone-work has under observation resulted in a peculiar phenomenon. I find that when the water is circulating through the coils due to excess of heat in the interior of the refrigerator, considerable moisture condenses on the stone-work and is absorbed to a certain extent by the pores of the stone-work. When the circulation is cut off this water gradually evaporates. As evaporation always requires heat this condition obviously prolongs the period preceding a call for another application of cold fluid to re-establish the chilled condition of the box.

In the partition formed by the stone-work I have provided at the top and bottom an opening 13 and 14 respectively. This is for the purpose of permitting the circulation of air. However, the air would not circulate in a refrigerator entirely encased with heat-absorbing means for the reason that there would be an equality of temperature in all the parts of the refrigerator which would result in the stability of the air. The proper preservation of food can only be obtained when there is a suitable circulation. Hence I stimulate this circulation by running out a set of coils 15 from either the coils $y$ or the coils $z$ on the left hand side at the top. These coils are not encased in stone but are exposed to the atmosphere and consequently result in chilling the atmosphere in the upper left hand corner of the refrigerator to a greater extent than at any other point. This obviously starts the circulation necessary to provide the best chilling of the food. Under this set of exposed coils may be provided a drip pan 16 to catch the water of excess condensation.

What I claim is:

1. In a refrigerator, the combination of a box, a plurality of coils for circulating fresh cold water therethrough supported in the box and encased in hardened heat-conducting material, and a set of coils for aiding in circulating said water and exposed in one part of the refrigerator to destroy the thermal equilibrium in the interior and promote circulation.

2. In a refrigerator, the combination of a box, a header supported in the box at the center and top and provided at the top with four outlet ports, two sets of coils each one running across the top, down one side and across the bottom and connecting with one of said ports, and a second pair of coils running each down through the center of the box and connecting with one of said ports in the header.

3. In a refrigerator, the combination of a box, a header supported at the top thereof and provided at the front with an enlargement forming four eduction ports, and four sets of coils connecting with said four eduction ports and running two across the top, down the sides and across the bottom of the box and the other two sets running down the center of the box.

4. In a refrigerator, the combination of a box, a header supported at the top and center of the box and provided with an enlargement forming on the sides two eduction ports and on the bottom two eduction ports, two sets of coils attached to the ports at the sides of the enlargement and running across the top, down the sides and across the bottom of the box, and two sets of coils attached to the ports in the bottom of the enlargement and running down the center of the box to form a partition.

5. In a refrigerator, the combination of a box, a header supported at the top of the box at the center and provided at the front with four eduction ports and at the rear with two eduction ports, separate coil sections connecting two sets with the eduction ports at the front, running across the top and sides and across the bottom of the refrigerator, two sets connecting with the eduction ports at the front and running 6. In a refrigerator, the combination of a box, a top header secured in the top of the box, a bottom header secured in the bottom of the box, each header provided with a plurality of eduction and intake ports, and a plurality of coil sections connecting with the eduction and induction ports at the top and bottom header.

7. In a refrigerator, the combination of a box, a top header and bottom header, coils connecting the top header with the bottom header and running across the top, down the sides and across the bottom of the box and connecting with both headers at the front, and coils running down the back of the box and connecting with both headers at the back.

8. In a refrigerator, the combination of a box, a top and bottom header secured to the top and bottom of the box at the center and provided with eduction and intake ports respectively, and separate coils running down across the top, down the sides and across the bottom of the box and connecting with both headers at the front, separate coils running down the center of the box and connecting with both headers at the front, and separate coils running down the back of the box and connecting with both headers at the back.

9. In a refrigerator, the combination of a box, a top header provided with a pair of eduction ports at the front and a pair of eduction ports at the rear, two sets of coils connecting with the eduction ports at the front and running across the top, down the sides and across the bottom of the box, and two sets connecting with the two rear eduction ports and running down the back of the box.

and two sets of coils connecting with the eduction ports at the rear of the header and running down at the back of the box.

10. In a refrigerator, the combination of a box, a plurality of coils supported in the box, a header for distributing water to the coils and including a boss, and a thermostat screwing into the boss and serving to regulate the circulation through the coils in accordance with the temperature in said header.

11. In a refrigerator, the combination of a box, a plurality of coils supported therein, a header for distributing the cooler in said coils provided with a threaded socket, and a thermostat and a barrel for encasing same and screwing into said threaded socket, said thermostat serving to regulate the circulation through the coils in accordance with the temperature of the water in said header.

12. In a refrigerator, the combination of a box, means for conveying water therethrough, a storage tank, one or more service taps, a waste line, and means for dividing and conveying the water that is drawn through the refrigerator separately to the storage tank and one or more service taps and to the waste line, for the purpose specified.

13. In a refrigerator, the combination of a box, coils for circulating water through the box, a lower header into which the water from the coils runs, a storage tank, one or more service taps, a waste line, and separate outlet lines for transmitting water from the header to the storage tank, the waste line and one or more service taps.

In testimony whereof I affix my signature.

LLOYD GROFF COPEMAN.